Patented May 3, 1938

2,116,303

UNITED STATES PATENT OFFICE 2,116,303

MINERAL WOOL COMPOSITION

Harold T. Coss, Somerville, N. J., assignor to Johns-Manville Corporation, New York, N. Y., a corporation of New York No Drawing. Application November 28, 1934, Serial No. 755,250

6 Claims. (Cl. 106—36.3)

This invention relates to an improved mineral wool and to the method of making the same. The invention relates particularly to mineral wool possessing the heretofore unknown combination of the three desirable properties of adequate length, fineness, and stability in water of the constituent fibres.

The art of mineral wool is highly developed, as the result of numerous investigations of active and able experimenters in this field. Many of the investigations have dealt with compositions suitable for use in making the wool. As a result, there have been proposed mineral wools made by fiberizing molten slag, natural rock, or glass compositions, with many variations in the proportions of ingredients in each of the several fundamental types of compositions. I have found, however, a composition not heretofore disclosed and a method of manufacture that make possible the production of a superior product.

It is an object of this invention to produce a long-fibered mineral wool of small diameter of fibres that, in felted form, has unusually low density, and that has satisfactory resistance to disintegration by water. Other objects and advantages will appear from the detailed description that follows.

In general, the invention comprises the product resulting from and/or the method of manufacture of mineral wool that includes melting together ingredients in carefully selected proportions and fiberizing the fused material under proper conditions, as illustrated below.

The ingredients used include a large proportion of silica and materials adapted to yield, on interfusion, a homogeneous glass containing, in addition to silica, alkaline earth metal oxide, sodium oxide, and, suitably, also alumina. It is understood that these oxides may be added as such, if it is so desired, and also that equivalent materials may be substituted, as, for example, a potash-yielding material for one yielding soda. The alkaline earth metal oxide may consist largely of lime or magnesia.

I have found that, with such materials used in critical proportions, I may make a fusion product that is of watery consistency, at the temperature selected for the subdividing or initial step in the fiberizing operation, and that is of a molasses-like consistency or viscosity, facilitating the shredding into long fibres, over a wide range of temperatures just below the temperature adapted to give the said watery consistency. The range of satisfactory proportions is more sharply limited, also, by the requirement that the finished mineral wool shall contain fibres of small diameter that are very resistant to solution in or disintegration by water as compared with commercial rock wools or ordinary commercial glass compositions.

I have found that the use of materials in proportions adapted to give a finished mineral wool of approximately the following composition, by ultimate analysis, is suitable for the present purposes. In this example, as elsewhere in the specification and claims, all proportions are expressed as parts by weight.

| Ingredients | Parts by weight in 100 parts of the finished mineral wool |
|---|---|
| Silica and alumina (of which the proportion of silica is advantageously at least 8 to 10 times the alumina) | 52–62 |
| Alkaline earth metal oxide | 26–43 |
| Sodium oxide or equivalent | 5–11 |
| Total of alkaline earth metal oxide and sodium oxide, preferred proportions | 37–48 |

The carbonates of the alkaline earth or alkali metals are suitable raw materials that may be used for yielding the corresponding oxides. Sandstone may be used as a source of silica. An argillaceous material may be used to offset any deficiency in alumina due to low alumina content of the other raw materials used. A suitable proportion of alumina is 3 to 7 parts in 100 parts of the finished mineral wool.

The non-inclusion, in the above composition, of small quantities of adventitious impurities (such as iron or manganese oxides) or of oxides deliberately added to increase the speed of melting (such as boron or zinc oxide) or to lighten the color (as cobalt oxide or nickel oxide), all of which may be present if their function is to be served, should not be construed either as altering the desirable proportions of the principal ingredients, or restricting the intended scope of the invention.

The mixture of suitable composition may be charged into a furnace, such as one of the cupola type, and there melted. The molten material, including the products of the interfusion, may then be made uniform in composition and temperature, as by being subsequently heated in a relatively small auxiliary furnace, under carefully controlled conditions, to a temperature of approximately 2550° F. or higher. This temperature converts the material to one of "watery" consistency, say, of 1 to 100 centipoises viscosity, adapted to be readily formed into a plurality of very small streams, as, for example, of diameter each of about one-fourth inch. The material is then allowed to flow as a plurality of such small streams, of approximately the size stated, into blasts of steam suitable for fiberizing the material. The result is, first, thorough subdivision and, then, stretching of the subdivided masses into long fibres. These operations are made possible by the facts that the composition of type described and of a watery consistency at the temperature of initial subdivision has a viscous, molasses-like consistency over a wide range of lower temperatures. This range may extend through 300° F. or more. In this wide range of temperature, the material is adapted to be stretched into long fine fibres, with a minimized tendency for the fibres to break off, even though the diameter of the resulting fibres is small. Also, there is a minimized tendency to form waste, bead-like material known in the industry as "shot". It is believed that this range of temperature, over which the material is suitable for being shredded into long fine fibres, is wider than the range for compositions heretofore used in making mineral wool and having a watery consistency at a practicable temperature. To this wide range is attributable, to a large extent, the superior qualities of the product produced.

The viscosity of the fused material at the time of being fiberized, as in the range of temperature between 2250 and 2550° F., promotes stringiness or drawing of long fibres, as indicated. I have used to advantage viscosities at this stage of the order of 100,000 to 1,000,000 centipoises. It will be understood that there is considerable difficulty in measuring accurately the viscosities under the conditions prevailing. My fused material, in the said range of temperature, has preferably a viscosity substantially higher than the viscosity of castor oil, suitably not lower than the viscosity of confectioners' glucose syrup, and preferably about like that of molasses, the comparisons of viscosity being made with the standard liquids at room temperatures.

Following the initial subdivision of the molten mass, there is rapid cooling of the material by the shredding steam, first, from the initial condition of watery consistency, into the range of temperatures giving the molasses-like viscosity adapting the material to being stretched into the long fine fibres and, then, to the solidification point of the resulting fibres. The solidified fibres are collected suitably, as, for example, on a moving conveyor belt in the bottom of a settling chamber.

The unique combination of properties of fibres so made, as compared with other commercial mineral wools, will appear from the following comparative approximate data:

| Property | The present product | Long fibre mineral wool from glass-like composition having higher proportion of soda than used by me | Mineral wool made from slag |
| --- | --- | --- | --- |
| Diameter of predominant fibres, microns | 5 | 50 | 4 |
| Length of predominant fibres, centimeters | 1½ | 5 | ½ |
| Density of felted product, under 15 pounds pressure per square foot, weight per cubic foot | 2.9 | 2.9 | 5.8 |
| Solubility in water | 2.1 | 13.0 | 18.2 |

The solubility in water measures the instability or disintegration in water and involves an empirical method of test, in which the solubility is expressed in terms of the alkalinity of water which has been allowed to contact with the mineral wool under controlled conditions. The larger the figure under "water solubility" in the above table, the greater is the alkalinity of the said water and the less the stability of the mineral wool under the influence of rain or other water in contact with the wool. Thus, the figures 2.1 and 18.2, respectively correspond to dissolved alkali which, when calculated as sodium silicate, equals approximately 0.05 and 0.45 parts by weight in 100 parts of the mineral wool.

As to fibre size, in general, it may be said that the fibres are predominantly of dimensions of the order of not substantially more than five microns in diameter and not substantially less than one centimeter in length. The fibres are relatively soft.

The analyses of typical mineral wools made in accordance with the present invention are given in the table below, in which the formulas show the form in which the several ingredients are calculated.

| Ingredient | Parts per 100 parts of finished product | |
| --- | --- | --- |
| Silica (SiO$_2$) | 56.6 | 49.6 |
| Alumina (Al$_2$O$_3$) | 3.8 | 6.3 |
| Iron Oxide (Fe$_2$O$_3$) | .6 | 1.3 |
| Manganese Oxide (Mn$_2$O$_3$) | .1 | .2 |
| Lime (CaO) | 20.0 | 21.7 |
| Magnesia (MgO) | 8.7 | 12.9 |
| Soda (Na$_2$O) | 10.2 | 8.0 |

It will be understood that the several ingredients are largely combined in the product.

The above description and specific examples are to be taken as illustrative only. Any variation or departure therefrom which conforms to the spirit of the invention is intended to be included within the scope of the claims.

What I claim is:

1. Mineral wool comprising silica, alumina, alkaline earth metal oxide, and sodium oxide, the proportion of silica being 8 to 10 times that of the alumina, the proportion of alkaline earth metal oxide being larger than that of the sodium oxide, and the proportion of sodium oxide being 5 to 11 parts to 100 parts of the mineral wool.

2. Mineral wool comprising silica, alumina, alkaline earth metal oxide, and sodium oxide and containing silica in the proportion of 8 to 10 times the alumina, alkaline earth metal oxide in larger proportion than sodium oxide, sodium oxide in the proportion of 5 to 11 parts to 100 parts of the mineral wool, the proportion of silica and alumina being 52 to 62 parts to 100 parts of the mineral wool.

3. An article of manufacture including mineral wool fibres comprising silica, calcium oxide and sodium oxide, the proportion of calcium oxide to silica being not less than 1 to 3, the proportion of sodium oxide being 5 to 11 parts and the proportion of silica being 49.6 to 56.6 parts in 100 parts of the mineral wool.

4. Mineral wool comprising silica and alumina, alkaline earth metal oxide, and sodium oxide, and containing silica in the proportion of 8 to 10 times the alumina, alkaline earth metal oxide in larger proportion than sodium oxide, sodium oxide in the proportion of 5 to 11 parts to 100 parts of the mineral wool, the alkaline earth metal oxide and the sodium oxide together being 37 to 48 parts and the proportion of silica and alumina being 52 to 62 parts in 100 parts of the mineral wool.

5. Mineral wool comprising the following ingredients occurring in substantially the following proportions expressed as parts by weight in 100 parts of the finished mineral wool:

| | |
|---|---|
| Silica (SiO$_2$) | 50 to 56 |
| Lime (CaO) | 20 to 22 |
| Soda (Na$_2$O) | 5 to 11 |

6. Mineral wool comprising the following ingredients occurring in substantially the following proportions expressed as parts by weight in 100 parts of the finished mineral wool:

| | |
|---|---|
| Silica (SiO$_2$) | 50 to 56 |
| Alkaline earth metal oxide (CaO and MgO) | 26 to 43 |
| Soda (Na$_2$O) | 5 to 11 |

HAROLD T. COSS.